United States Patent
Liu et al.

(10) Patent No.: US 6,226,521 B1
(45) Date of Patent: May 1, 2001

(54) CHANNEL ALLOCATION METHOD AND APPARATUS

(75) Inventors: Ming Liu, Potomac, MD (US); Jay Sengupta, Londoin; Michael Petre Wasse, Bedfordshire, both of (GB)

(73) Assignee: International Mobile Satellite Organization (GB)

( * ) Notice: Subject to any disclaimer, the term of this patent is extended or adjusted under 35 U.S.C. 154(b) by 0 days.

(21) Appl. No.: 09/077,363

(22) PCT Filed: Nov. 27, 1996

(86) PCT No.: PCT/GB96/02925

§ 371 Date: Aug. 10, 1998

§ 102(e) Date: Aug. 10, 1998

(87) PCT Pub. No.: WO97/20435

PCT Pub. Date: Jun. 5, 1997

(30) Foreign Application Priority Data

Nov. 28, 1995 (GB) .................................................. 9524314

(51) Int. Cl.[7] .............................. H04Q 7/20; H04B 7/185
(52) U.S. Cl. ......................... 455/453; 455/450; 455/452; 455/427; 455/12.1
(58) Field of Search ................................... 455/427–430, 455/450–453, 12.1, 454

(56) References Cited

U.S. PATENT DOCUMENTS

| | | | |
|---|---|---|---|
| 4,672,657 | * | 6/1987 | Dershowitz .......................... 455/414 |
| 5,280,630 | * | 1/1994 | Wang .................................... 455/452 |
| 5,394,561 | * | 2/1995 | Freeburg ............................. 455/428 |
| 5,437,054 | * | 7/1995 | Rappaport et al. .................. 455/451 |
| 5,526,404 | * | 6/1996 | Wiedeman et al. ................. 455/430 |
| 5,867,765 | * | 2/1999 | Nilsson ................................ 455/427 |

FOREIGN PATENT DOCUMENTS

WO 94/18804   8/1994   (WO) .
WO 97/15995   5/1997   (WO) .

* cited by examiner

Primary Examiner—Reinhard J. Eisenzopf
Assistant Examiner—Eliseo Ramos-Feliciano
(74) Attorney, Agent, or Firm—Banner & Witcoff, Ltd.

(57) ABSTRACT

In a satellite communications network, local pools of available carriers are assigned to each ground earth station GES by a network channel management station NCMS, which stores a pool of unallocated carriers. If the number of unused carriers in a local pool falls below a predetermined level, additional carriers are allocated from a regional pool in the network channel management station NCMS. If the number of carriers in a local pool exceeds a predetermined level, the excess carriers are released to the regional pool so that they can be allocated to local pools in other ground earth stations GES.

15 Claims, 8 Drawing Sheets

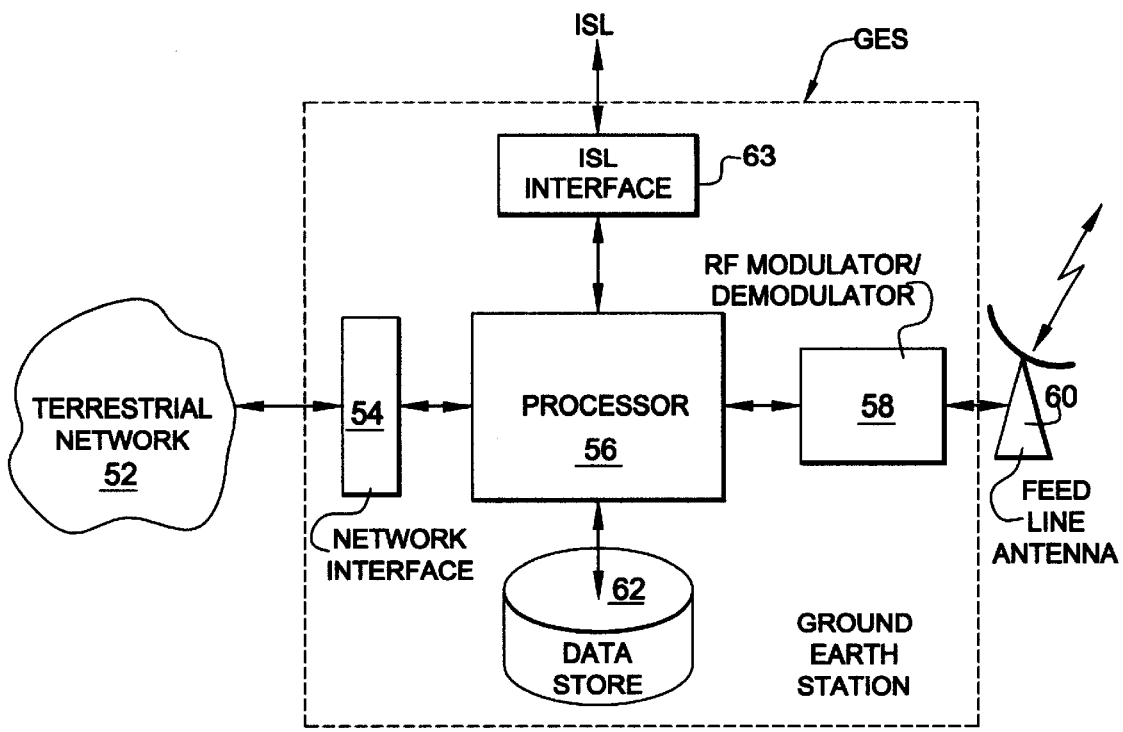
FIG. 4
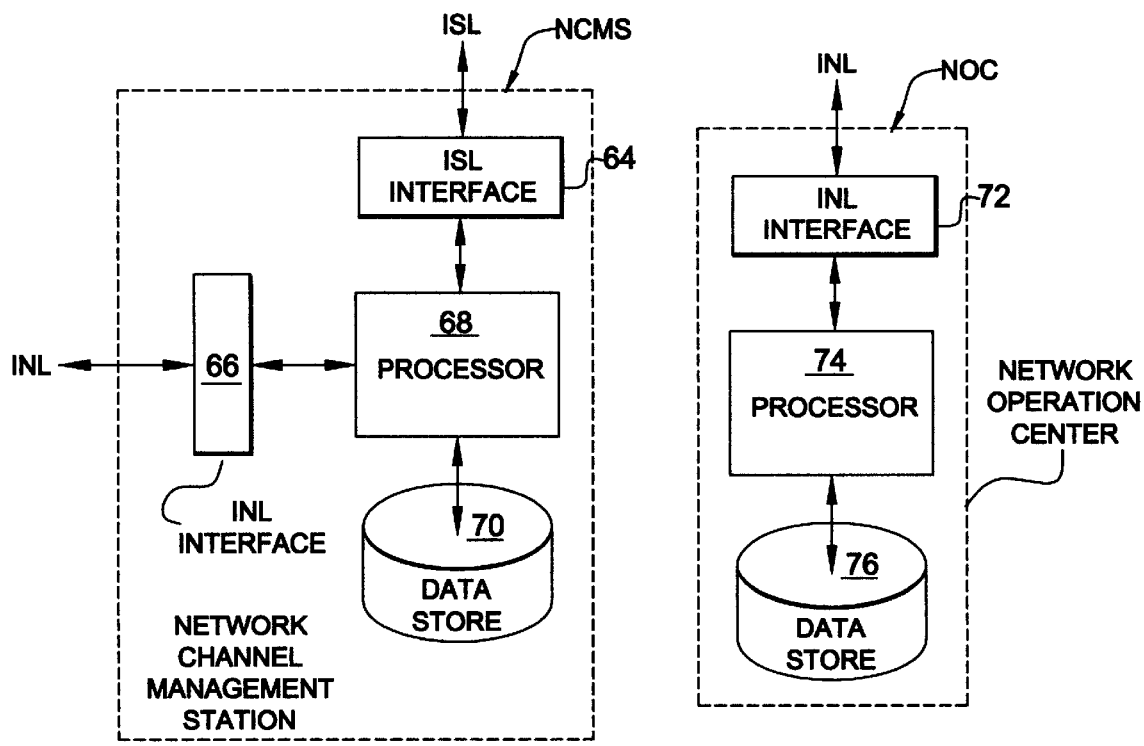
FIG. 5
FIG. 6

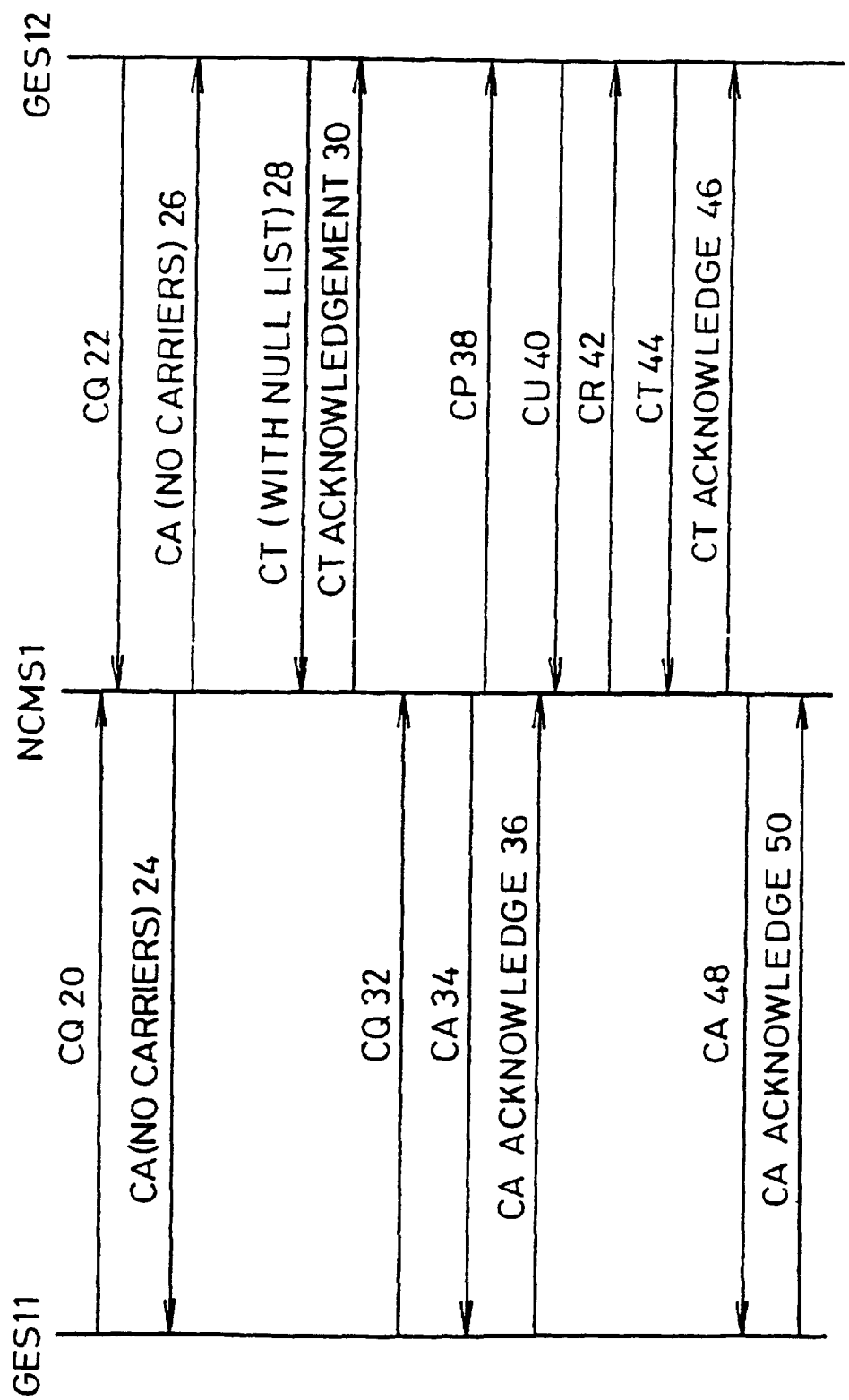

CHANNEL ALLOCATION METHOD AND APPARATUS

The present invention relates to a method and apparatus for controlling the allocation of channels to communications stations and for selecting channels for communication at communications stations.

A known example of channel management is employed in the Inmarsat (TM) Aero Services, which are designed for aeronautical satellite communications. Details of the Inmarsat (TM) Aero Services can be found, for example, in "Satellite Communications" by Calcutt & Tetley, First edition 1995.

The architecture of a part of the Inmarsat (TM) network is shown in FIG. 1. A geostationary satellite S1 provides a satellite communications transponder for satellite communications by any one of a number of aircraft earth stations $AES_1, , , AES_n$ located within the coverage region of the satellite S1. The aircraft earth stations AES comprise communications equipment located on aircraft, and can be used for satellite communications via the satellite S1 when the aircraft earth stations AES are within the beam coverage area of the satellite S1. In this example, there are four satellites S1 to S4 which provide communications coverage over four different areas, usually referred to as "ocean regions".

The aircraft earth stations AES communicate via the satellite S1 to one of a plurality of ground earth stations (GES) GES11 to GES1n which direct radio frequency signals to and receive radio frequency signals from the satellite S1. Each GES is connected to a network operated by a service provider, such as a public service telephone network (PSTN), a terrestrial cellular network or a local area network, so that fixed terminals connected to the network can communicate with any one of the aircraft earth stations AES.

The ground earth stations GES are operated by different service providers and are typically located in the country in which the service provider operates.

When the user of an AES initiates a call, the AES sends a signal via the satellite S1 to a selected GES according to the service provider selected by the user. The selected GES sends a signal back to the AES indicating the carrier to be used for the call. The Aero circuit-mode service uses single channel per carrier (SCPC) full duplex transmission channels, so that the carrier required for a single communication comprises a pair of frequencies. Communications then proceed between the AES and the selected GES.

Likewise, if a terrestrial caller initiates a call to a selected AES, a call request signal is sent to a selected GES through the terrestrial network. The GES sends a calling signal through the satellite S1 indicating the AES to which a call is to be set up. If the AES is within the coverage area of the satellite S1 and is logged on to the network, it sends an acknowledgement signal via the satellite S1 to the GES which in turn signals to the AES which carrier is to be used for the call.

From the above description, it will be appreciated that data must be available at each GES indicating which carriers may be used by that GES for communication with the AES. Each GES is therefore allocated a subset of all the channels which are available for communication via the satellite S1. The allocation of carriers to each GES is controlled by a network operations centre NOC which periodically updates the carrier allocation to the ground stations GES through an inter-station communications link ISL.

This system of carrier allocation, though simple and reliable, is inefficient because each GES must be allocated enough carriers to cope with peak demand at that GES. Therefore, at any one time a large proportion of the carriers are unused.

In case of failure of the geostationary satellite S1, a backup geostationary satellite S1' is provided and is available for communication with each GES in the event of failure of the geostationary satellite S1.

Further, GESs $GES2_x$, $GES3_x$, $GES4_x$, are provided for communication with further satellites S2, S3, S4 covering further ocean regions.

A backup network operation centre NOC' is also provided, in case of failure by the primary network operation centre NOC.

An alternative network architecture, which is used in other Inmarsat (TM) services such as Inmarsat-M (TM) and Inmarsat-B (TM), is shown in FIG. 2.

The same geostationary satellites are used for these services as for the Aero Services. In this example, a plurality of mobile terminals $MES_1$ to $MES_n$ communicate via the satellite S1 with a plurality of land earth stations LES11 to LES1n. However, this example differs from the previous example in the method employed to allocate carriers. Each LES is arranged to communicate with a network coordination station NCS1, through an inter-station communications link ISL, which in this example is a satellite communication link through the satellite S1. The network control station NCS1 is also able to communicate directly with the MESs through the satellite S1.

When a call is initiated by an MES user, the MES sends a call request signal both to the NCS and to a selected LES. The NCS selects a suitable carrier for the communication and signals the selected carrier both to the MES and to the selected LES. The call then proceeds between the MES and the selected LES.

If a call is initiated by a terrestrial user connected to an LES, the LES transmits a calling signal through the selected satellite S and awaits a response from the called MES. If a response is received from the MES, the LES sends a channel request signal to the NCS, which selects a carrier for the communication and signals the carrier selected to both the MES and the LES.

One NCS and one backup NCS provided for each satellite S store a set of all the carriers available for communication via that satellite. This set of carriers is updated from time to time by data received from an NOC over an inter-network link INL.

In this system, carriers are assigned to the LESs by the NCS only as they are needed and unused channels are available to any of the LESs which request them. However, a considerable delay may be incurred between a call request and the completion of call set-up, because of the delay involved in sending a request to the NCS and in communicating the allocated carrier from the NCS to the LES. Moreover, if there is a high demand for calls at several of the LESs, the inter-station link ISL may become congested, leading to further delays in the allocation of carriers and possible failure of call set-up if an MES times out and terminates the call because no carrier has been allocated to it within a predetermined time.

Moreover, this architecture is vulnerable to failure by the NCS, in which case no carriers can be allocated to the LESs and the entire network for the associated ocean region may fail. A back-up network control station NCS' is provided for each primary NCS so as to avoid such catastrophic failure. However, the back-up NCS' must operate in synchronism with its associated primary NCS so that, if a failure occurs, the back-up NCS' is immediately available for carrier allocation and is consistent with the state of the primary NCS immediately before the moment of failure. Providing such a back-up NCS is costly, particularly if the back-up NCS is remote from the primary NCS, which is desirable in order to provide an effective back-up against failure due to localised disruptions. If the back-up NCS also fails, the entire network for the associated satellite also fails.

Hence, this architecture, though efficient, is inherently less reliable than the distributed network architecture of the Inmarsat-Aero (TM) system.

The document WO94/18804 discloses a real-time channel borrowing method for a cellular communication system, in which a channel is "borrowed" from an adjacent cell in response to a channel request from a user, if no channels are available in the user's cell. Once the borrowed channel is released, it is returned to the adjacent cell.

The article "Comparisons of Channel-Assignment strategies in Cellular Mobile Telephone Systems" by Ming Zhang and Tak-Shung P. Yum, IEEE Transactions on Vehicular Technology, Vol. 38, No. 4, pages 211 to 215 describes various real-time channel borrowing methods.

STATEMENT OF INVENTION

In accordance with one aspect of the present invention, there is provided a method of selecting a channel for communication at a communications node, comprising storing data representing channels dedicated to that communications node and selecting one of the dedicated channels for communication via the communications node, wherein the data is modifiable by sending a request signal to a remote network node and receiving in response thereto an allocation signal from the remote network node indicating additional channels dedicated to the communications node, and modifying the data to add the additional channels to the set of dedicated channels at the communications node. In this way, communications channels may be instantly available at the communications node, giving improved reliability and speed of call set-up. Moreover, additional channels may be added to the dedicated channels on request to the remote network node, so that the number of channels available can be varied dynamically according to demand and the channels can be allocated efficiently.

The request is sent to the remote network node if the number of dedicated channels falls below a predetermined low level. Thereby, a minimum number of available channels may be ensured at the communications node.

Preferably, the communications node may remove dedicated channels from the set, and indicate which channels have been removed to the remote network node, so that the remote node is enabled to allocate the removed channels to other communications nodes. Preferably, this step is performed if the number of available dedicated channels rises above a predetermined high level.

Preferably, the predetermined high and low levels may be varied according to the current or predicted demand for communications through the communications node.

In accordance with another aspect of the present invention, there is provided a method of controlling channel allocation to a plurality of communications nodes each of which stores data representing a set of channels dedicated to that node, comprising receiving a request signal from one of said nodes and sending data representing additional channels dedicated to that node in response to the request signal. A maximum and/or minimum number of channels is determined for each communications node and this maximum and/or minimum number is communicated to that communications node. Preferably, the maximum and/or minimum number are determined in accordance with current and/or expected communications traffic demand through that node. Thus, the efficiency of allocation of channels to the communications nodes can be optimised.

Preferably, the method includes sending an interrogation signal to one or more of the communications nodes, and receiving status information from each of the communications nodes to which the interrogation signal is sent.

The present invention extends to apparatus arranged to carry out any of the above methods.

BRIEF DESCRIPTION OF DRAWINGS

Specific embodiments of the present invention will now be described with reference to the drawings, in which:

FIG. 4 is a diagram of a ground earth station in the embodiment of FIG. 3;

FIG. 5 is a diagram of a network channel management station in the embodiment of FIG. 3;

FIG. 6 is a diagram of a network operations centre in the embodiment of FIG. 3;

FIG. 10 is a signalling diagram in an alternative situation in an embodiment of the present invention.

Figure 1:
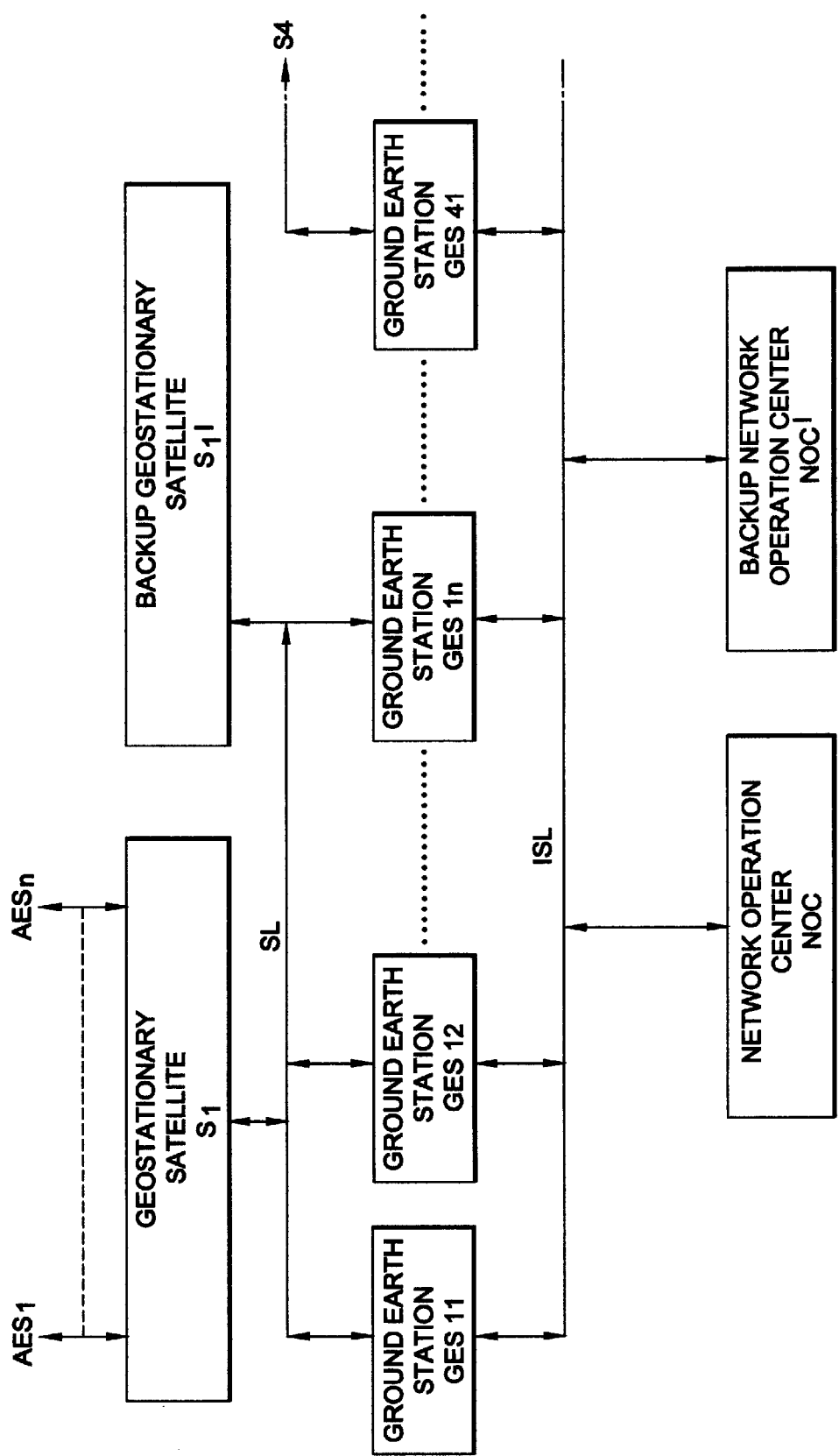
FIG. 1 is a diagram of a first prior art network architecture.
Figure 2:
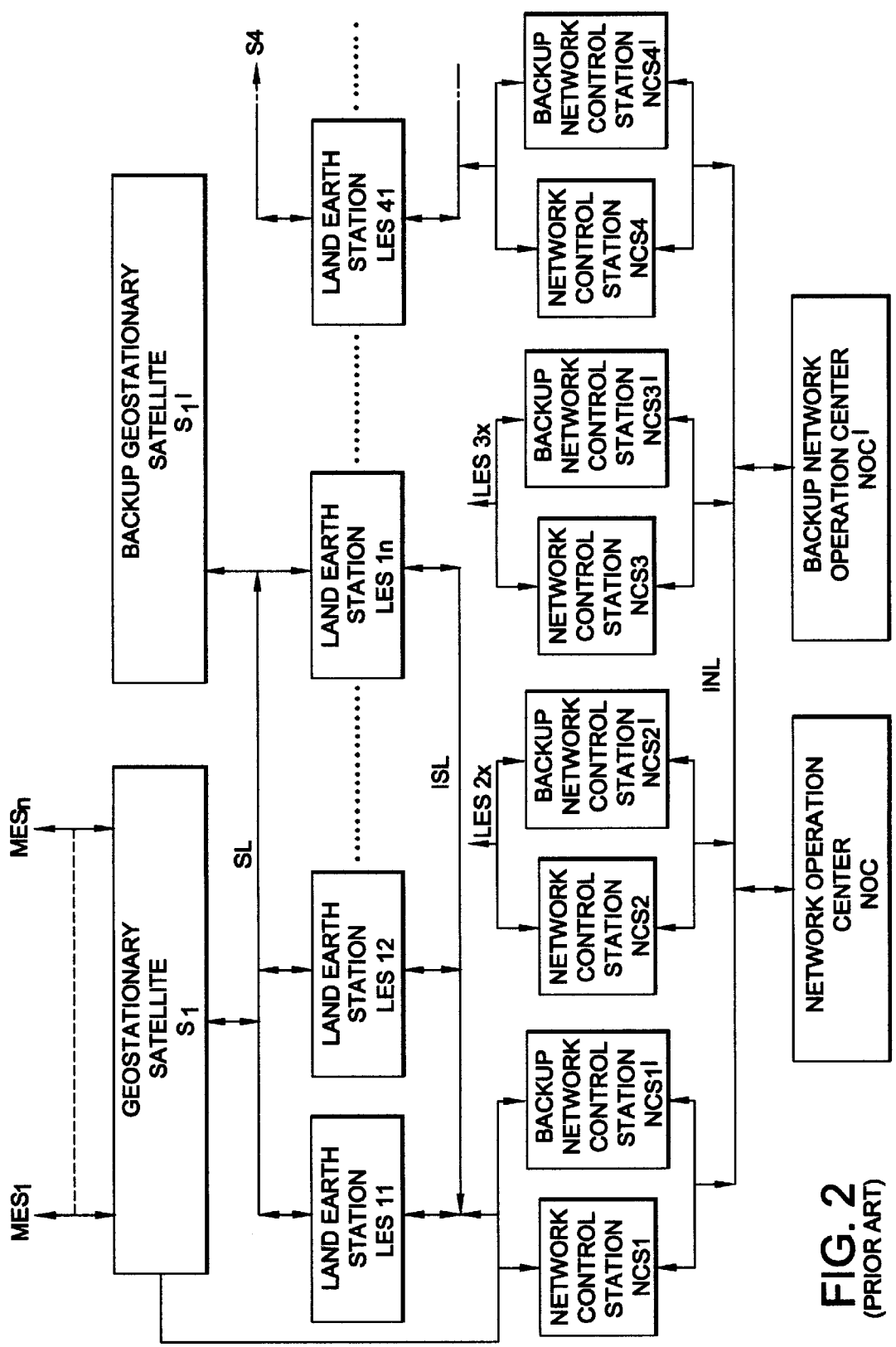
FIG. 2 is a diagram of a second prior art network architecture.
Figure 3:
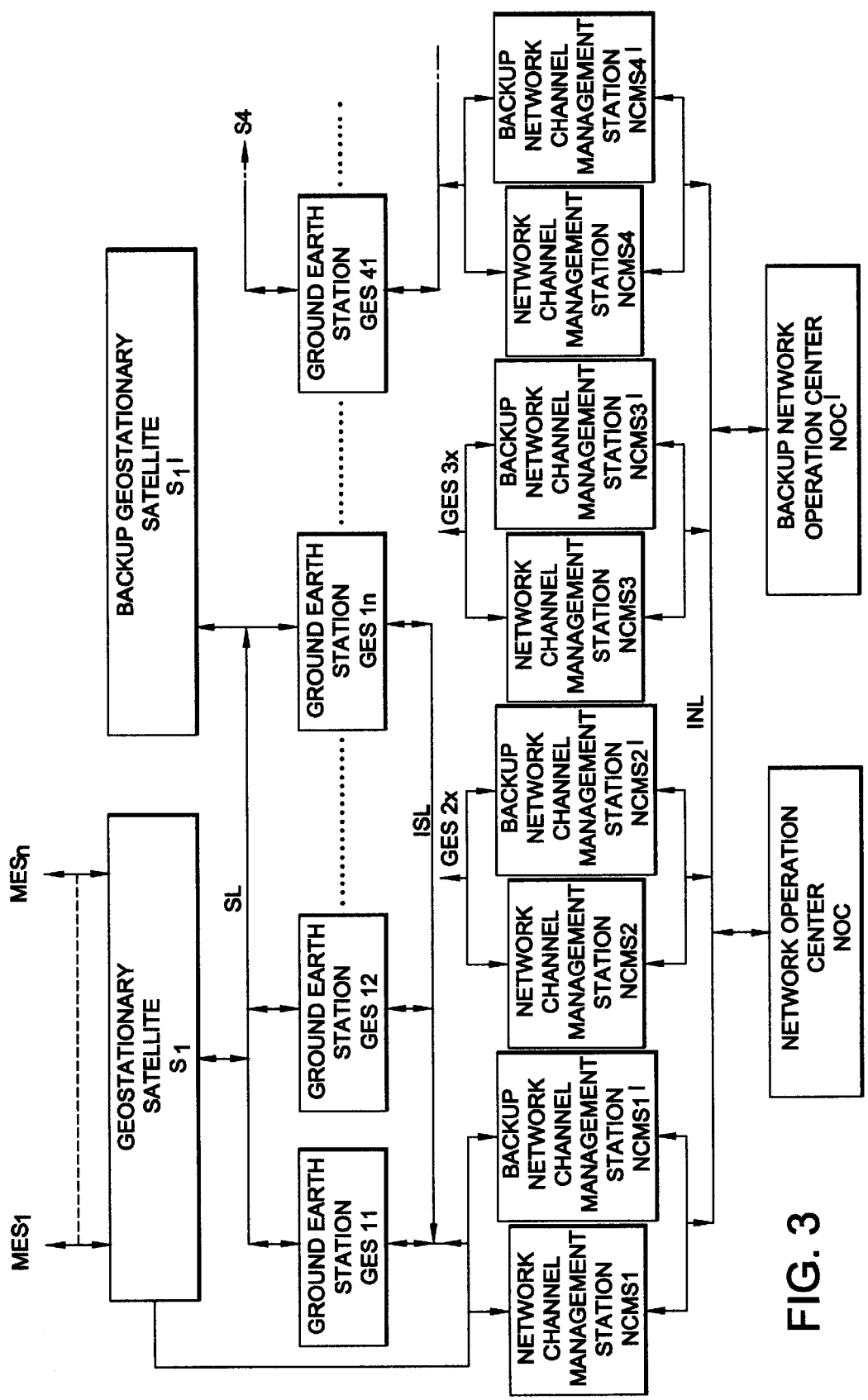
FIG. 3 is a diagram of a network in an embodiment of the present invention.

A specific example of a network architecture incorporating embodiments of the present invention will now be described with reference to FIG. 3. In this embodiment, a plurality of aircraft earth stations AES1 to AESn are able to communicate via the satellite S1 to a plurality of ground earth stations GES11 to GES1n. This embodiment is designed for operation with satellites which project multiple overlapping beams over their coverage areas, including a global beam which encompasses the whole coverage area.

The GESs are connected via an inter-station link ISL to a network channel management station NCMS1 and to a back-up network channel management station NCMS1'. The primary and back-up network NCMSs are connected to the primary NOC and the back-up NOC' via an inter-network link INL.

The NOCs are also connected to further NCMSs and back-up NCMSs, NCMS2, NCMS2', NCMS3, NCMS3' and NCMS4, NCMS4' which are connected respectively to ground earth stations G21 to G2n, G31 to G3n and G41 to G4n for communication via respective satellites S2 to S4 serving ocean regions 2 to 4.

Ground Earth Stations

FIG. 4 shows the principal features of each of the ground earth stations GES. The GES is connected to a terrestrial network 52, through which calls are routed to and from the aircraft earth stations AES, by means of a network interface 54. The terrestrial network may be a PSTN, ISDN or terrestrial cellular network, for example, and the network interface 54 converts call signals on the terrestrial network 52 to digital data and vice versa. A GES processor 56 converts the digital data to a format suitable for transmission over the satellite link SL and vice versa. The connected data is RF modulated by an RF modulator/demodulator 58 and transmitted as RF signals through a feeder link antenna 60 to the satellite S, where the signals are retransmitted to the aircraft earth stations AES to which the call is addressed. Likewise, RF signals from an aircraft earth station are transmitted to the satellites, retransmitted to the feeder link antenna 60, demodulated by the RF modulator/demodulator 58, converted by the GES processor 56 and routed through the terrestrial network 52 to the other party.

The GES processor 56 is connected to the interstation link ISL via an ISL interface 62, which also provides access to a backup interstation link such as a dial-up connection, in the event of primary interstation link failure. The GES processor 56 accesses a GES data store 63, which stores data necessary for call set-up and channel management as will be described below in more detail.

Network Channel Management Station

FIG. 5 shows the principal features of each of the network channel management stations NCMS. The NCMS is connected to the ISL by an ISL interface 64 and to the INL by an INL interface 66.

The functions of the NCMS are performed by an NCMS processor 68, while data used by the NCMS is stored in an NCMS data store 70, as described in detail below.

Network Operations Centre

FIG. 6 shows the principal features of each network operations centre NOC. The NOC is connected to the INL by an INL interface. The functions of the NOC are performed by an NOC processor 74, while data used by the NOC is stored in an NOC data store 76, as described in detail below.

The method of channel allocation employed in this embodiment will now be described in detail.

Carrier Definition Table

Each NCMS data store stores a carrier definition table. The carrier definition table defines all the carriers available to the aeronautical services, and specifies the allocation rules for these carriers. The carrier definition table is periodically loaded into the data store from the NOC, together with a specification of the total forward link and return link power permitted for each satellite.

The carrier definition table defines each channel carrier according to the following parameters:

1. "Carrier ID", a label reflecting the service type, satellite, channel type, satellite beam and ranking number associated with each carrier.
2. "Current user name" indicating the reservation status of the carrier, to be described in detail below.
3. "Service" indicating the service type of the carrier, for example, aero service.
4. "Satellite and ocean region" indicating the satellite and ocean region to which this carrier is assigned.
5. "Feeder uplink beam" specifying which beam is to be used for the feeder uplink between a specific GES and the satellite S, for satellites which allow multiple feeder uplink beams.
6. "Feeder downlink beam", for satellites which have multiple feeder downlink beams.
7. "Service uplink beam" indicating the uplink beam to be used from an AES to the satellite S.
8. "Service downlink beam".
9. "Channel type" indicating the channel type used for the carrier, such as Aero-H (TM), Aero-H+ or Aero-I (TM).
10. "Carrier ranking number" indicating the priority with which the carrier is to be chosen.
11. "Feeder uplink frequency".
12. "Feeder uplink polarisation".
13. "Feeder downlink frequency".
14. "Feeder downlink polarisation".
15. "Service uplink frequency".
16. "Service downlink frequency".
17. "Forward link satellite power", the nominal power assigned to that carrier.
18. "Return link satellite power".
19. "Allocation rule", indication whether this carrier may be used if other specified carriers are being used, or the time during which this carrier may be used.

These parameters may be stored and transmitted in any suitable code, such as ASCII codes or binary formats.

The carrier definition table is used by the NCMS in order to determine the allocation of carriers to different GESs, different channel types and different satellite beams in an ocean region, as well as between different satellites covering an ocean region or in adjacent ocean regions.

Within the aero service, different channel types are used for Aero-H (TM), Aero-H+ (TM), and Aero-I (TM) services, which provide different bit rates and require different antenna gains.

The allocation rules defined in a carrier definition table reflect the constraints of inter-carrier interference, such as inter-satellite, inter-beam and inter-channel interference, and define other carriers which are mutually exclusive with a carrier and cannot be used at the same time.

The carrier ranking numbers in the carrier definition table indicate the allocation preference with which the carrier should be selected from other carriers of the same channel type in the same beam of the same satellite, so that low ranking carriers are assigned first and higher ranking carriers are only used during peak traffic periods.

Carrier Pools

Each NCMS and each GES stores data representing sets of "pools" of unoccupied carriers. For each pool there are defined two operation parameters, pool high level (PHL) and pool low level (PLL), which define respectively the maximum and minimum number of unoccupied carriers in the pool. Carriers are added to or removed from the pool so as to maintain the number of carriers between the pool high level and the pool low level.

Local Carrier Pools

Each GES maintains a local carrier pool LCP of carriers for each service type for each beam of the satellite S. When a call is requested by an AES, the GES selects an unoccupied carrier from one of its LCPs corresponding to the appropriate beam and service type, indicates to the AES the selected carrier and begins communication with the AES using the selected carrier. Likewise, if a call is initiated by a terrestrial user through a GES to an AES, an unoccupied carrier is selected from the relevant LCP stored at the GES and the identity of this carrier is signalled to the called AES. The data representing the LCP is modified so as to mark the selected carrier as occupied, until the call is completed and the carrier is once again marked unoccupied and returned to the LCP.

The LCPs may be represented by many different data structures which are in themselves well-known. For example, a carrier in an LCP may be stored as carrier parameters similar to those used in the carrier definition table in the NCMS, as a data item in a stack corresponding to one LCP sorted in rank order.

For each LCP, there is stored at the relevant GES the pool high level (PHL) and a pool low level (PLL). If the number of unoccupied carriers in any LCP falls below the corresponding PLL, the GES sends a request signal to the NCMS requesting additional carriers of the relevant beam and channel type to be reserved for that LCP. Likewise, if the number of unoccupied carriers in any LCP exceeds the PHL, a signal is sent by the GES indicating the identities of the excess carriers in the LCP, and these excess carriers are deleted from the LCP.

Global and Regional Carrier Pools

Carrier pools are also defined within the NCMS. An unreserved carrier in the carrier definition table has its current user name left blank. All unreserved carriers in the carrier definition table are defined as occupying a global carrier pool (GCP). There is also defined in the carrier definition table a plurality of regional carrier pools (RCP), one for each service type in each beam of the satellite served by the NCMS. The NCMS selects a variable number of carriers from the GCP to be reserved for each RCP, based on the current and expected traffic demands and traffic distribution characteristics in the corresponding beams and service. The carriers are defined as belonging to an RCP by setting their current user name field to an NCMS identity code, and by further storing data indicating to which RCP the carrier belongs.

The carriers in each RCP are available for reservation by any of the GESs served by the NCMS. The arrangement of carriers into RCPs allow spectrum sharing among different satellites, beams and service types to be determined separately from and in advance of the allocation of carriers to individual GESs.

According to the allocation rules defined in the carrier definition table, the use of one carrier may prevent the use of others, and some of the carriers may only be used during certain times of the day. The NCMS determines which carriers are selected for each RCP based on the allocation rules, current and expected traffic demands, traffic distribution characteristics and the carrier ranking numbers specified in the carrier definition table. When transferring carriers from an RCP to the GCP and vice versa, the NCMS calculates total forward and return link satellite power budgets according to the nominal satellite power assigned to each carrier which is not in the GCP, including the carriers in the RCPs and the LCPs and occupied carriers, to ensure that the total power budgets do not exceed the forward link and return link satellite power requirements specified in the carrier definition table. If they do, carriers are removed from the RCPs to the GCP.

There is defined for each RCP a respective pool high level (PHL) and a pool low level (PLL). The total number of carriers in each RCP is compared with the PHL and the PLL, and additional carriers are transferred from the GCP to the RCP if the number falls below the PLL, while carriers are returned to the GCP from the RCP if the number exceeds the PHL. The NCMS varies the PLL and PHL for each RCP according to the current and expected traffic demands and their distribution characteristics, together with the safety requirements for aeronautical services and the total satellite power constraints. The NOC is able to send RCP high level data and low level data to the NCMS, so as to override the PHLs and PLLs determined by the NCMS.

In order to ensure that a carrier is always immediately available for emergency services, the PLL for any LCP is always set to at least one unless no AESs are logged on for the beam and service corresponding to that LCP.

If there are no AESs logged on for a particular service type in a particular beam via a particular ground earth station, the corresponding LCP PLL is set to zero.

Carrier Allocation Control

The exchange of carrier data between GESs and their NCMS is performed by sending carrier allocation control signals over the inter-station link ISL. Six different carrier allocation control signals are used: carrier request (CQ), carrier return (CT), carrier utilization (CU), carrier remove (CR), carrier poll (CP) and carrier allocation (CA).

Carrier Request (CQ)

When a GES detects that the number of unoccupied carriers remaining in one of its LCPs falls below the corresponding PLL, or when it receives from an AES a request for carriers from a LCP for which the PLL is zero, it sends a CQ signal immediately to the NCMS so as to request additional carriers for the relevant LCP.

The CQ signal contains data indicating the maximum number of carriers occupied in the LCP in the last 30 minutes or since the last CQ signal relating to the LCP was sent to the NCMS if this was less than 30 minutes ago, the number of occupied carriers and the minimum call priority the local pool is supporting. The NCMS sends a confirmation signal to the GES upon receiving a CQ signal and acts upon it as described below.

Carrier Allocation (CA)

On receiving a CQ signal from a GES, the NCMS responds with a CA signal listing all the carriers allocated to the LCP of that GES. If no carriers are available, the CA signal indicates no carriers.

Carrier Return (CT)

When a GES detects that the number of unoccupied carriers remaining in one of its LCPs rises above the PHL for that pool, it sends a CT signal to the NCMS to indicate the surplus carriers which have been removed from the LCP. The CT signal contains data identifying all surplus carriers released by the GES and returned for allocation to the NCMS.

On receiving a CT signal, the NCMS updates the carrier definition table by changing the current user name for the surplus carriers from the identity data of the GES to the identity data of the NCMS, and sends a confirmation signal to the GES. Thereafter, the GES cannot use the surplus carriers for communication unless they are subsequently returned by the NCMS.

Carrier Poll (CP)

In order to obtain specific information about the current utilization of carriers within one or more LCPS at a GES, the NCMS sends a CP signal to that GES.

Carrier Utilization (CU)

When the number of carriers in an RCP falls below the PLL and no suitable carriers are available from the GCP, the NCMS maintaining that RCP sends a CP signal to every GES that has been allocated carriers from this RCP. The GESs which received the CP signal respond immediately with a CU signal which contains the same information as a CQ signal from that GES.

The NCMS also polls a GES if information is required about the current carrier utilization efficiency of a specific LCP or group of LCPs.

Carrier Remove (CR)

When an NCMS requires carriers from selected LCPs, for example sending a CP signal to a GES, it sends a CR signal to the GESs which maintain these LCPs so as to release carriers from the selected LCPs to a designated RCP.

The CR signal specifies the number of carriers required to be removed from each of the selected LCPs and indicates whether occupied carriers are to be pre-empted. The CR signal may also specify which carriers are to be removed.

On receiving a CR signal a GES sends a CT signal specifying the carriers released and returned to the NCMS.

If no unocccupied carriers are available in the designated LCP, the GES terminates the lowest priority call which is occupying a carrier from the designated LCP so as to return the carrier to the NCMS.

Adaptive Carrier Allocation

When the number of carriers in a RCP is below its PLL, the NCMS attempts to select a block of additional carriers from the GCP by changing the current user name for these carriers to indicate reservation by the NCMS.

If there are no carriers of the type required for the RCP available in the global carrier pool, the NCMS sends CP signals to all the GESs to which it is connected in order to find and select unoccupied carriers which the NCMS has previously allocated to a GES from this RCP and to reallocate these carriers to the RCP. If necessary, the PLLs of the LCPs from which carriers are removed are reduced so as to prevent the GES from requesting the carriers back.

If there are no unoccupied carriers available at any GES, the NCMS will stop allocating carriers remaining in the RCP to LCPs for non-safety services.

When the number of carriers in a RCP is above its PHL, the NCMS returns the surplus carriers to the GCP by removing its identity code from the current user name field of these carriers.

When a GES detects that the number of unoccupied carriers in one of its LCPs is falling below the PLL, it sends a CQ signal to its NCMS so as to request additional carriers. Upon receiving such a CQ signal, the NCMS selects a block of carriers from the relevant RCP. However, if the number of carriers remaining in the RCP is below its PLL and the CQ signal indicates a request for non-safety service carriers, the block size of the CA signal shall be set to zero, so that no carriers are allocated to the LCP.

When a GES detects that the number of carriers in one of its LCPs is above the PHL, it sends a CT signal to the NCMS identifying the surplus carriers and removes the surplus carriers from its LCP.

On the basis of the carrier allocation control signals received from the GES's and of a database, the NCMS calculates the current and expected traffic demands, their distribution characteristics and the number of carriers available in each LCP. The NCMS uses this information, together with the carrier availability in each RCP and in the GCP to determine dynamically the value of PHL and PLL for each regional and local carrier pool. The NCMS also determines the block sizes of carriers used for carrier selections from the GCP or carrier allocations to LCPs. The block sizes are non-negative integers. The carriers selected or allocated in the block need not be defined in the carrier definition table as using adjacent frequencies.

The parameter values of PHLs, PLLs and carrier block sizes determine the carrier selection and allocation scheme used by each NCMS. By dynamically changing these parameter values, the NCMSs can select between a predictive carrier allocation scheme and an on-demand carrier allocation scheme for the different LCPs.

While satisfying aeronautical safety requirements and optimising overall section utilization over the entire network, the NCMSs allocate as many carriers as possible to LCPs, with only the minimum necessary number of carriers remaining in each RCP, so as to reduce the signalling traffic load on the inter-station link and to simplify failure recovery, as described hereinafter.

Figure 7:
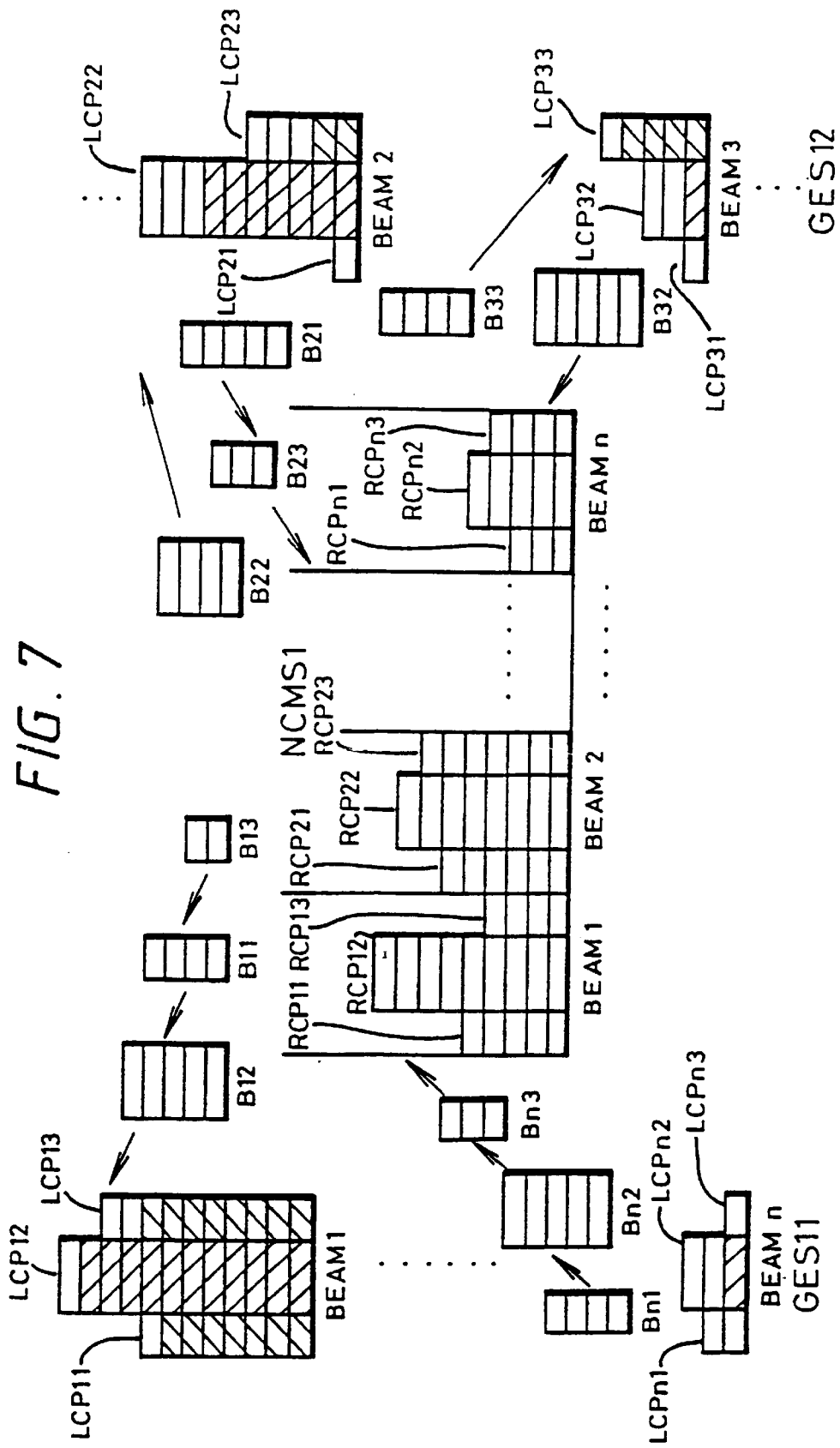
FIG. 7 is a schematic representation of a method of channel allocation in an embodiment of the present invention.

FIG. 7 shows a representation of an example of carrier allocations. In this figure, the LCPs, RCPs and blocks of carriers for beam x and service y are denoted LCPxy, RCPxy and Bxy respectively. Unoccupied carriers are represented by empty blocks while occupied carriers are represented by shaded blocks. The same notation is used for LCPs in each GES.

In local carrier pools LCP11, LCP12 and LCP13 of GES11, the numbers of unoccupied carriers are 1, 1 and 2 respectively. The GES11 sends a CQ signal to the NCMS1 indicating that carriers are required for the LCPs of all the service types for beam 1. The NCMS1 allocates block B12 of carriers to local carrier pool LCP12, block B11 of carriers to local carrier pool LCP11 and block B13 of carriers to local carrier pool LCP13.

In Beam n of GES11, there are excess carriers for each service type corresponding to local carrier pools LCPn1, LCPn2 and LCPn3. These excess carriers are returned to NCMS1 in blocks Bn1, Bn2 and Bn3 respectively.

For Beam 2 at GES12, excess carriers are allocated to service types 1 and 3 corresponding to local carrier pools LCP21 and LCP23, but the number of unoccupied carriers for service 2, in local pool LCP22, is less than the pool low level. Therefore, carriers are returned to NCMS1 from local pools LCP21 and LCP23 but are transferred from the regional pool RCP22 to the local pool LCP22 in block B22. In the Beam 3 local pools of GES12, there are excess carriers in local pool LCP32, which are returned to regional pool RCP32 in block B32. There is a deficiency of carriers in local pool LCP33 and carriers are transferred from regional pool RCP33 in block B33. In local pool LCP31, PLL is 1 and there is one carrier available. No carrier transfer is required.

Figure 8:
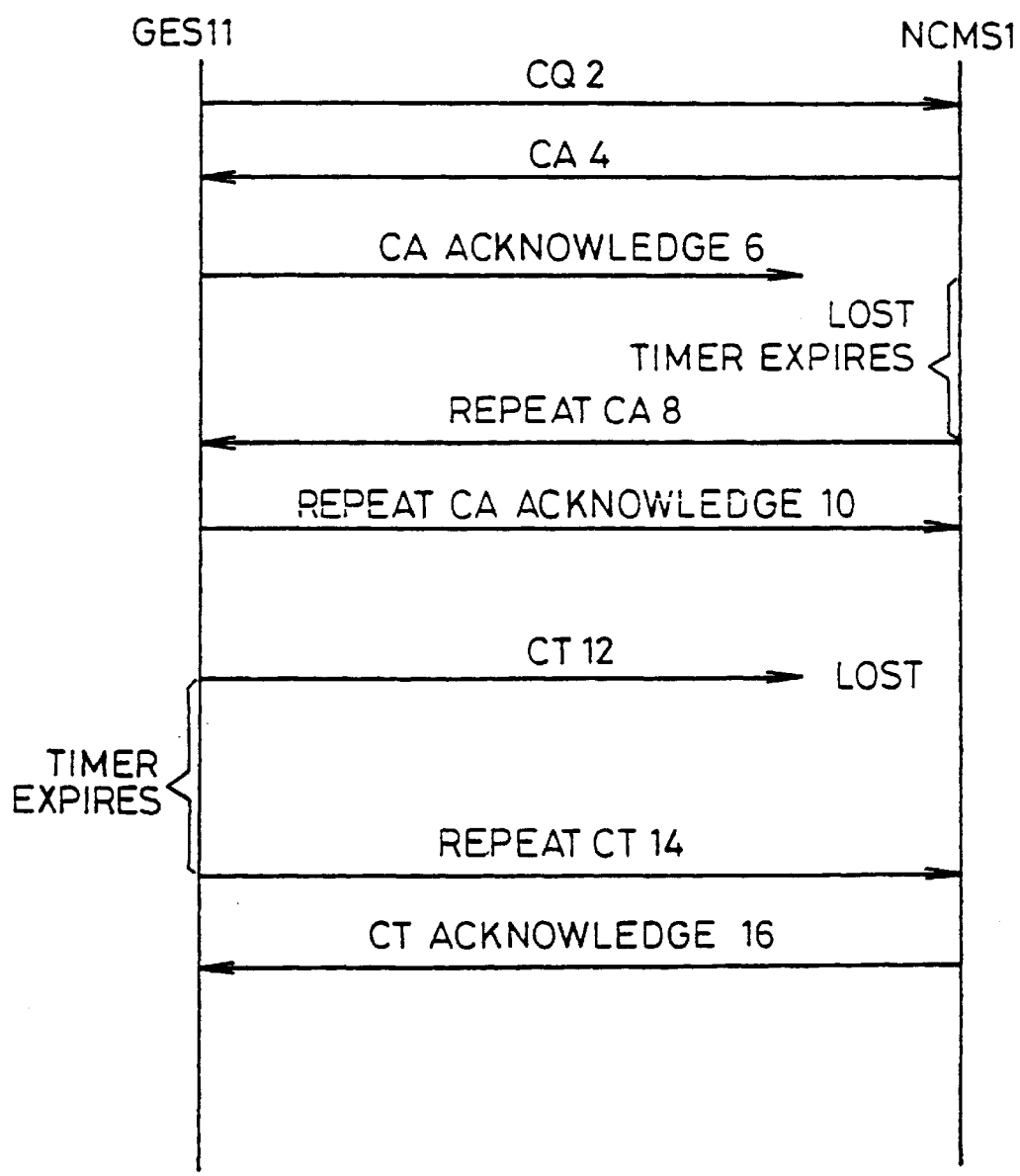
FIG. 8 is a signalling diagram in an embodiment of the present invention.

FIG. 8 shows an example of signalling between GES11 and NCMS1. GES11 sends a CQ signal 2 to NCMS1, which responds with a carrier allocation signal 4. GES11 confirms receipt of the carrier allocation signal with a CA acknowledgement signal 6, but the signal is lost on the interstation link. A timer in NCMS1 detects that no confirmation has been received to the CA signal 4 within a predetermined time and therefore sends a repeat CA signal 8. GES11 responds with a repeat CA acknowledgement signal 10, which is correctly received by the NCMS1. Subsequently, the GES11 sends a CT signal to NCMS1, but this is lost on the inter station link. GES11 includes the timer which is set when the CT signal is sent and detects whether a carrier removal signal has been received from the NCMS1 within a predetermined period. In this case, the timer times out with no carrier removal signal having been received and the GES11 therefore sends a repeat CT signal 14, to which the network control station NCMS1 responds with a CT acknowledgement signal 16.

Figure 9:
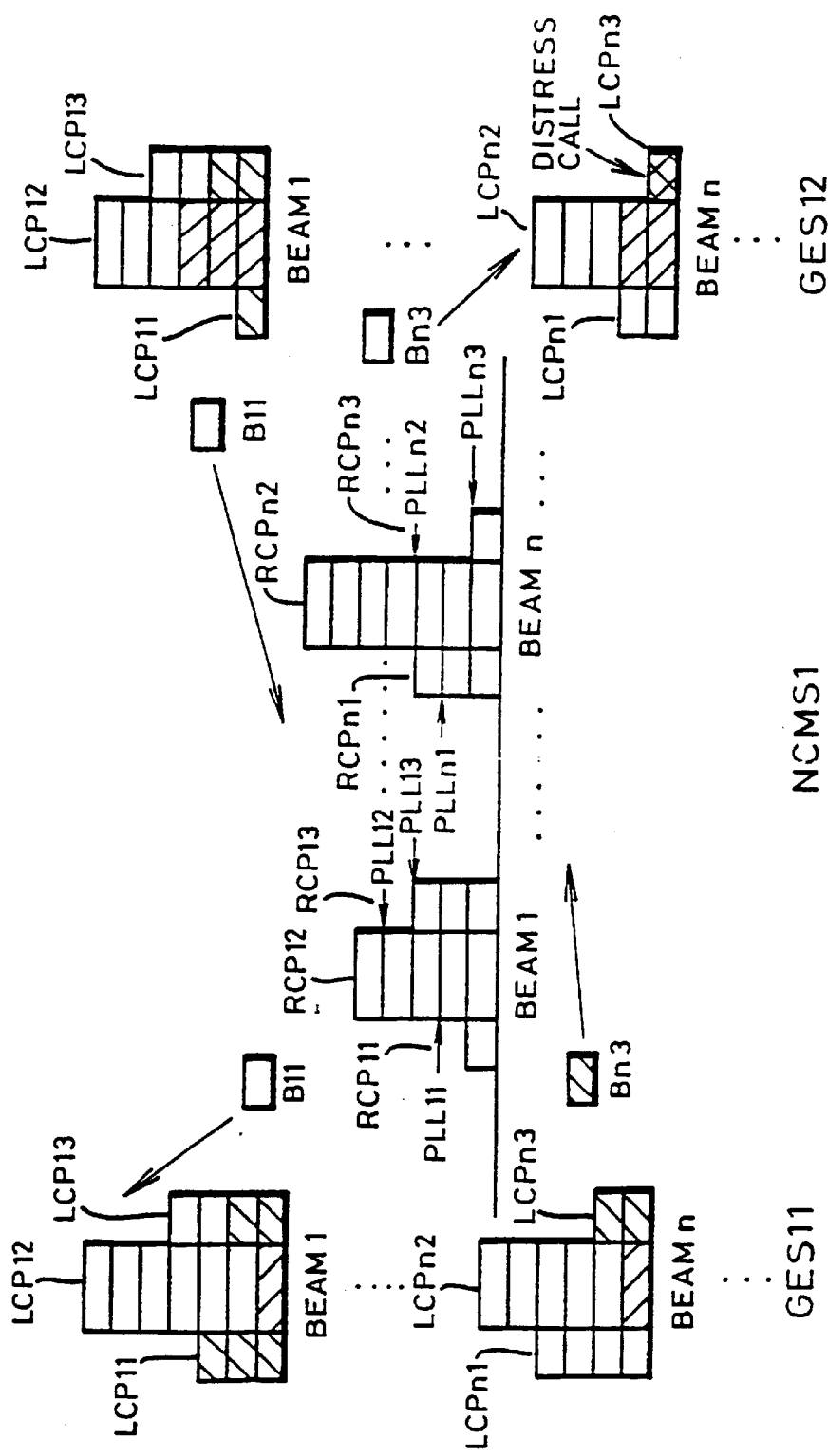
FIG. 9 is a representation of an alternative carrier allocation method in the embodiment of the present invention.

An alternative example will now be described with reference to FIG. 9. In this example, local pool LCP11 of GES11 has no unoccupied carriers and GES11 requests a carrier for this local pool LCP11. However, there is only one carrier available in regional pool RCP11, which is below the pool low level of 2, and the carrier is requested for a non-safety service. The NMCS1 polls the other GESs for an available carrier for beam 1 service 1. GES12 has such an available carrier and releases this carrier, in block B11, to the NCMS1, which allocates this block to GES11.

GES12 receives a distress call in service type 3, Beam n. No carriers are available in regional pool RCPn3, but some of the carriers in pool LCPn3 of GES11 are occupied with non-safety calls. Using the CR signal, NCMS1 requests one of the occupied carriers from local pool LCPn3 of GES11. The lowest priority call using one of these carriers is terminated and the released carrier, in block Bn3, is returned to the NCMS1 where it is allocated to GES12 for the distress call.

A signalling diagram of another example is shown in FIG. 10.

NCMS1 receives from GES11 a CQ signal 20, and from GES12 a CQ signal 22. In each case, the number of carriers in the relevant regional carrier pool is below the pool low level and therefore these carriers are only available to safety services. Therefore, the NCMS1 sends to GES11 a CA signal 24 indicating that no carriers are available, and likewise sends a CA signal 26 to GES12. GES12 sends a CT signal indicating a null list of carriers, in order to cancel the previous request for carriers. The NCMS1 responds to this with a CT acknowledgement signal 30.

However, at the GES11, all the carriers in a particular local carrier pool have now become occupied by safety traffic and therefore carriers must be added to this local carrier pool to serve any additional safety traffic. GES11 sends a CQ signal 32 indicating that carriers are required for safety traffic. NCMS1 must now release a carrier from the relevant regional carrier pool, even if the regional carrier pool is below its pool low level. NCMS1 sends a CA signal 34 to GES11 allocating the carriers for safety traffic. GES11 responds with a CA acknowledgement signal 36.

The NCMS1 must now replenish the regional carrier pool since its level is below the pool low level and therefore sends a CP signal 38 to the GES12 to determine whether the GES12 has unoccupied carriers which can be returned to the regional carrier pool. GES12 responds with a CU signal 40 indicating that such carriers are available. NCMS1 then sends a CR signal 42 to GES12 to request removal of the carriers. Removal of the carriers from the LCP at GES12 is indicated by sending CT signal 44 to NCMS1 and NCMS1 responds with a CT acknowledgement signal 46.

After the regional carrier pool becomes available for non-safety services again, NCMS1 resumes carrier allocation to those GESs which previously sent it a CQ signal but have not been allocated carriers because these were previously unavailable for non-safety services. In this case, the CQ signal 20 has not yet been dealt with and therefore NCMS1 sends a CA signal 48 to GES11, which responds by sending a CA acknowledgement signal 50.

If an aircraft earth station AES logs onto a GES, that is, it registers its presence without any call being made, and the GES does not have any unoccupied or non-safety occupied carriers suitable for use by that aircraft earth station, the GES will request at least one carrier from the NCMS suitable for communication with the newly logged-on aircraft earth station.

Each NCMS is able to analyze current and expected traffic demands according to beam, service type and satellite. A model may be used to predict traffic demand as a function of location and time, on the basis of information such as previous demand from the GESs, flight schedules of airlines, and the number of aircraft earth station logged onto to a GES and therefore potentially able to make or receive a call. The NCMSs are interconnected over the inter-network link INL so as to allow available carriers to be coordinated between NCMSs, since the traffic demand for a given ocean region varies from time to time, and NCMS may require more carriers to support a growing traffic demand. Where carriers are mutually exclusive with carriers available to other ocean regions, for example in an overlap area between ocean regions, the NCMSs coordinate between each other which ones of the mutually exclusive carriers may be used by each NCMS. In order to reduce the amount of coordination needed between NCMSs, such carriers are assigned high ranking numbers in the carrier definition table so that they need only be used under peak traffic conditions.

NCMS Failure Recovery

Because each GES may have unoccupied carriers previously allocated to it, the failure of an NCMS is not immediately catastrophic and the backup NCMS does not need to be updated continually.

When an NCMS fails, it ceases transmission on the inter-station link ISL and the inter-network link INL. The backup NCMS detects the inactivity of the primary NCMS and is automatically activated. The backup NCMS polls its GESs and receives the CU signal from each of them, whereby the carrier definition table in the backup NCMS is updated to record all the carriers assigned to LCPs. The backup NCMS then constructs suitable RCPs, which need not correspond precisely to the RCPs which have been defined by the primary NCMS. The backup NCMS receives a carrier definition table from the NOC.

The backup NCMS need not be permanently connected into the network, but may be connected in only when a failure is detected. While the backup NCMS is updating its carrier definition table, the GESs, can continue to allocate channels using their existing LCPs.

If a GES receives no response either from a primary NCMS or form its backup within a predetermined time, the GES sends the NCMS a query signal which is also received by all the other GESs serving the same ocean region. If the GES receives no response to the query signal from the NCMS, and receives a query signal from at least one other GES, a complete NCMS failure is detected and is signalled to the NOC via any suitable link. On receiving a failure signal from at least two GESs in an ocean region, the NOC signals the NCMS failure to all the other NCMSs.

By communication with the GESs, or from previous communication with the failed NCMS, the NOC determines which carriers were present in the RCPs of the failed NCMS.

If a GES is using all the carriers from one of its LCPs to support safety services, it immediately requests one additional carrier from the NOC via any suitable link and the NOC authorises the GES to use one of the carriers which was in the RCP of the failed NCMS. The GES returns a carrier to the NOC from the same LCP when there is an unoccupied or non-safety occupied carrier available in this LCP.

If a GES receives a log-on request from an AES which may require a carrier from an empty LCP after the NCMS failure, it rejects the log-on request.

In the event of a prolonged NCMS failure in an ocean region, the NOC signals to each GES in the ocean region to activate a contingency frequency plan stored at the GES. Each carrier in this contingency frequency plan is allocated to a specific LCP although some LCPs may not be allocated any carriers. For each beam in the ocean region corresponding to the failed NCMS, the NOC directs all GESs which serve that region to switch all LCPs corresponding to that beam to the contingency frequency plan at a coordinated time, usually at off-peak hours.

A new contingency frequency plan may be sent from the NOC to each GES.

After an NCMS recovers from its failure, it signals its recovery to its GESs, to the other NCMSs and to the NOC which then resume their normal operation mode.

The above embodiment is described with reference to the Inmarsat (TM) aeronautical services. However, the same carrier allocation scheme may be used for other Inmarsat (TM) services, and the same NCMS and NOC may be used for two or more types of service. Different RCPs may be used for each service and channel carriers may be exchanged between services by allowing the GCP to contain carriers suitable for more than one type of service.

The present invention may be applied to many other communications networks, such as other satellite communications networks or terrestrial cellular communications networks. For example, in a terrestrial cellular system, local carrier pools may be stored in individual base stations, allowing calls to be set up without real time communication with a control station to which a group of base stations is connected.

In the specific embodiment, each carrier represents a forward link and a return link frequency. However, the present invention is also applicable to communications networks in which other channel types are used, such as TDMA and CDMA.

Alternative embodiments of the present invention may be envisaged which use elements of the embodiment described above but with a different network architecture. For example, the functions of the NCMSs may be incorporated in the NOC, so that the GESs for all ocean regions are allocated channels by the NOC. Alternatively, unoccupied channels may be exchanged directly between GESs using a negotiation protocol which allows GESs with a carrier deficit to identify ground earth stations with a carrier excess of the right type and to allow reallocation of channels between them. Such an arrangement may be used during NCMS failure to improve the efficiency of channel allocations, or during normal operation.

In satellite communications systems in which channel selection is performed on board the satellites, the satellites may store local carrier pools so as to allow them to select channels allocated to them in advance by ground stations.

The present invention is not restricted to mobile satellite communications, but is also applicable to radio frequency communications by fixed or temporarily fixed stations.

What is claimed is:

1. Apparatus for selecting a channel for wireless communications, comprising:
    storage means arranged to store data representing available communications channels,
    selecting means for selecting one of the available communications channels for a communication,
    requesting means for sending a request signal to a remote station in response to any of said available communication channels being selected for said communication such that the number of available communications channels falls below a predetermined low level of at least one;
    receiving means for receiving from the remote station an allocation signal representing a number of additional communications channels, the number being a non-negative integer, and
    modifying means for modifying said data so as to additionally include any of said additional communications channels as ones of said available communications channels.

2. Apparatus as claimed in claim 1, including adjusting means for adjusting the value of the low level.

3. Apparatus as claimed in claim 2, wherein the modifying means is operable to modify said data so as to remove one or more channels from the available communications channels, further comprising:
    sending means for sending to the remote station a channel release signal representing the one or more removed channels.

4. Apparatus as claimed in claim 3, wherein the modifying means is responsive to the number of available communications channels rising above a predetermined high level.

5. Apparatus as claimed in claim 4, wherein the adjusting means is operable to adjust the value of the high level.

6. Apparatus as claimed in claim 2, wherein the adjusting means is responsive to a level control signal from the remote station.

7. Apparatus as claimed in claim 1, including reporting means or sending to the remote station said data representing available communications channels.

8. Apparatus as claimed in claim 1, including replacing means for replacing said data with backup data representing backup available communications channels.

9. Apparatus as claimed in claim 1, including communication means for performing communication via the selected channel.

10. Apparatus as claimed in claim 1, wherein the channels are satellite communications channels.

11. A satellite including apparatus as claimed in claim 10.

12. Apparatus as claimed in claim 1, wherein the channels are terrestrial cellular communications channels.

13. A communications station including apparatus as claimed in claim 1.

14. A network control station including apparatus as claimed in claim 1.

15. A method of selecting channels for wireless communications, comprising storing data representing available channels, selecting one of the available channels for a communication, sending a request signal to a remote station in response to any of said available communication channels being selected for said communication such that the number of available communications channels falls below a predetermined low level of at least one, receiving in response thereto an allocation signal representing a number of additional communications channels, and modifying said data so as additionally to represent said additional communications channels.

* * * * *

UNITED STATES PATENT AND TRADEMARK OFFICE
CERTIFICATE OF CORRECTION

PATENT NO.   : 6,226,521 B1
DATED        : May 1, 2001
INVENTOR(S)  : Ming Liu et al.

It is certified that error appears in the above-identified patent and that said Letters Patent is hereby corrected as shown below:

<u>Title page,</u>
Item [75], Inventors: "Londoin" has been replace with -- London --

Signed and Sealed this

Twenty-fourth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,226,521 B1
DATED : May 1, 2001
INVENTOR(S) : Ming Liu et al.

It is certified that error appears in the above-identified patent and that said Letters Patent is hereby corrected as shown below:

<u>Title page,</u>
Item [73], Assignee: "International Mobile Satellite Organization (GB)" has been replaced with -- Inmarsat, Ltd. (GB) --.

Signed and Sealed this

Fourth Day of February, 2003

JAMES E. ROGAN
*Director of the United States Patent and Trademark Office*